No. 623,944. Patented Apr. 25, 1899.
B. F. CARPENTER.
APPLIANCE FOR AUTOMATICALLY OPERATING PNEUMATIC OR ELECTRIC CARS.
(Application filed Dec. 4, 1897.)
(No Model.) 6 Sheets—Sheet 3.
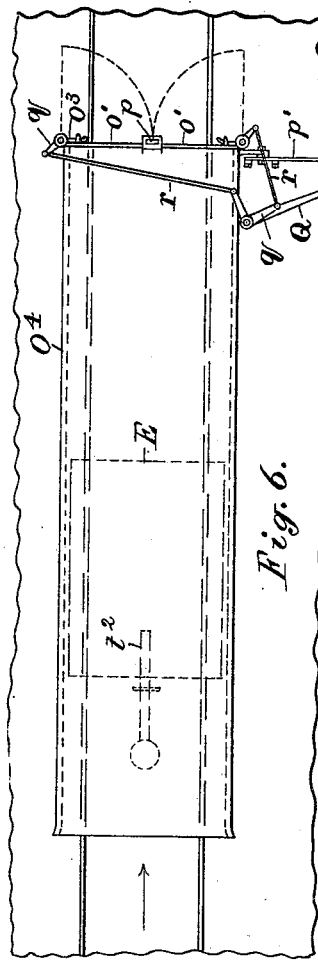
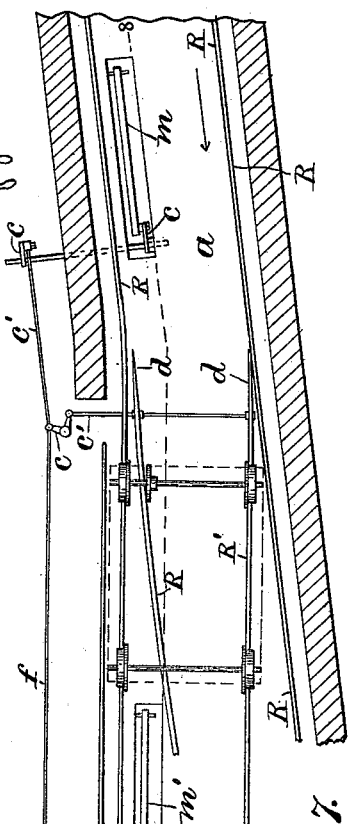
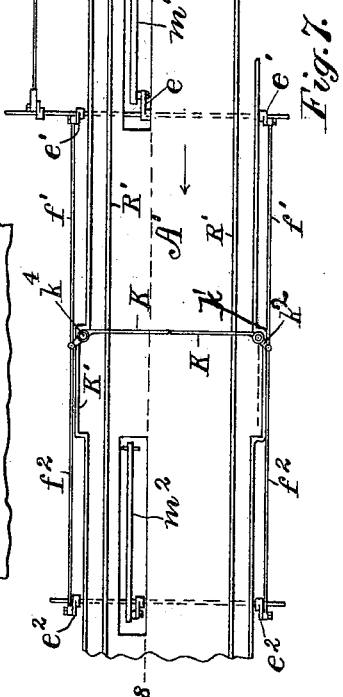
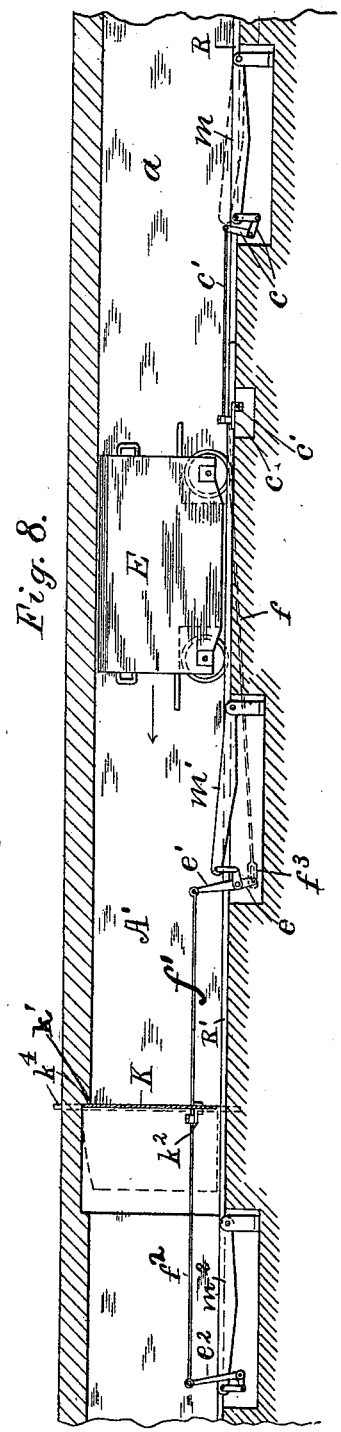
Attest:
L. Lee.
Edw. F. Kinsey.
Inventor.
Benjamin F. Carpenter
per Thomas S. Crane, Atty.

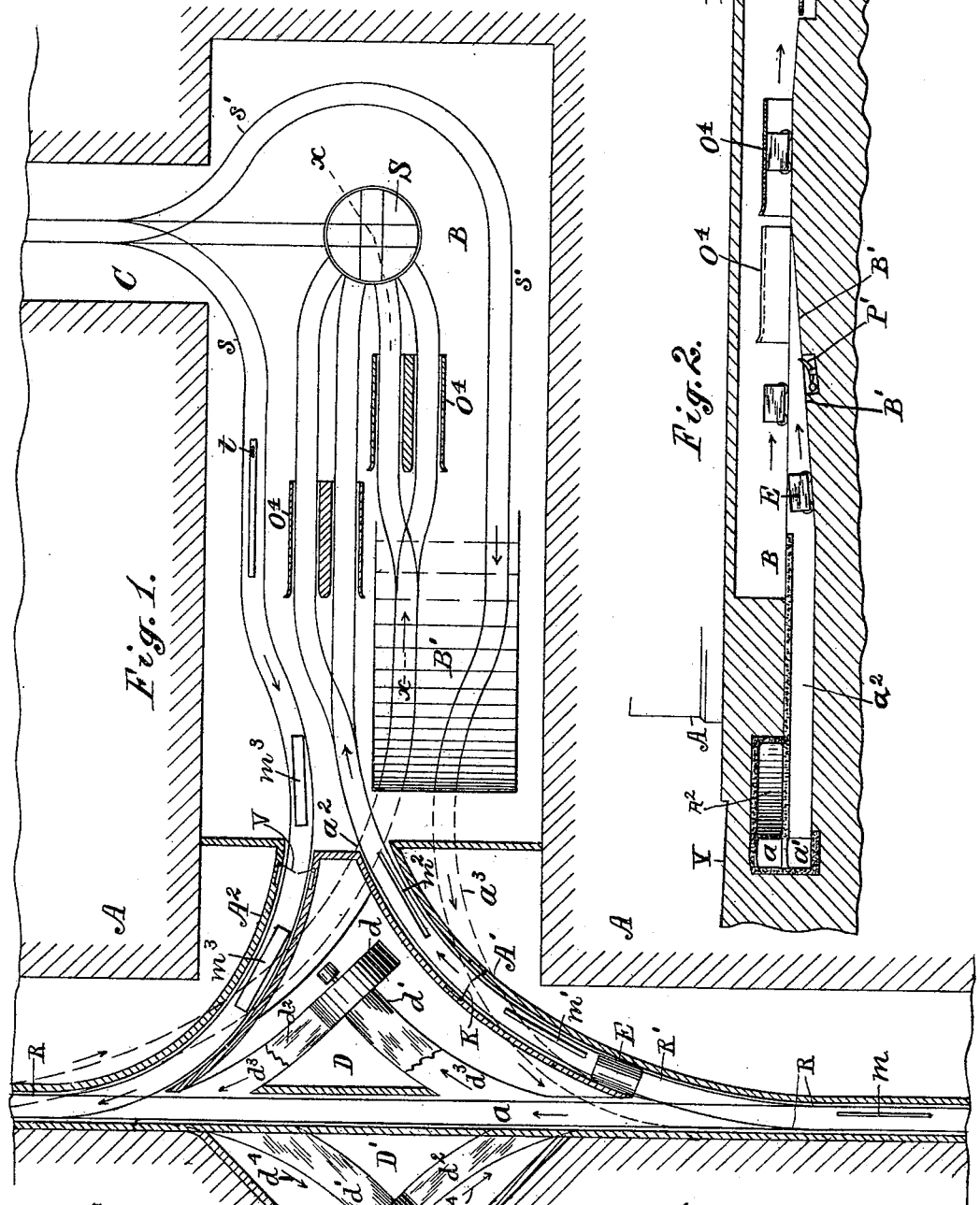

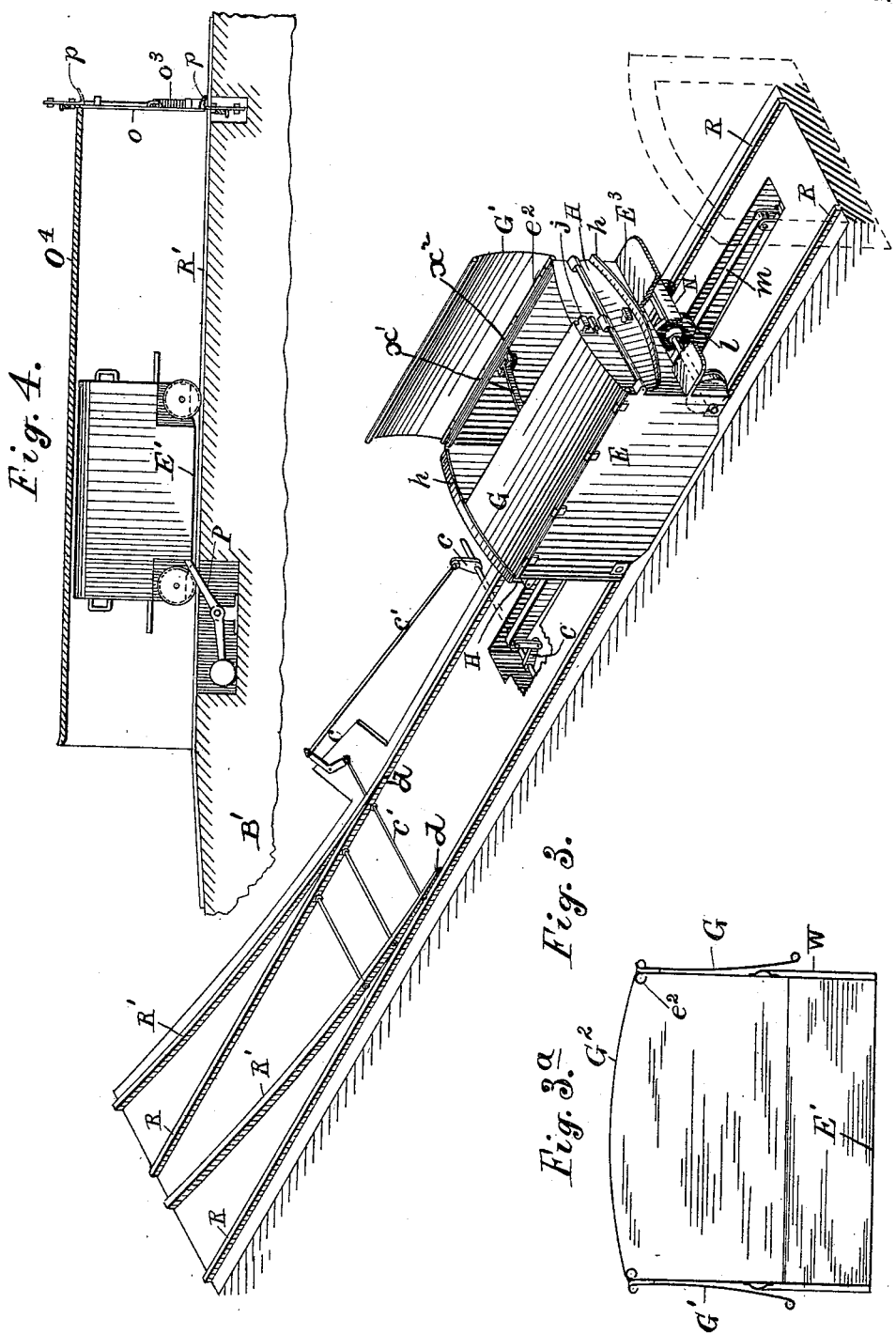

No. 623,944. Patented Apr. 25, 1899.
B. F. CARPENTER.
APPLIANCE FOR AUTOMATICALLY OPERATING PNEUMATIC OR ELECTRIC CARS.
(Application filed Dec. 4, 1897.)
(No Model.) 6 Sheets—Sheet 4.
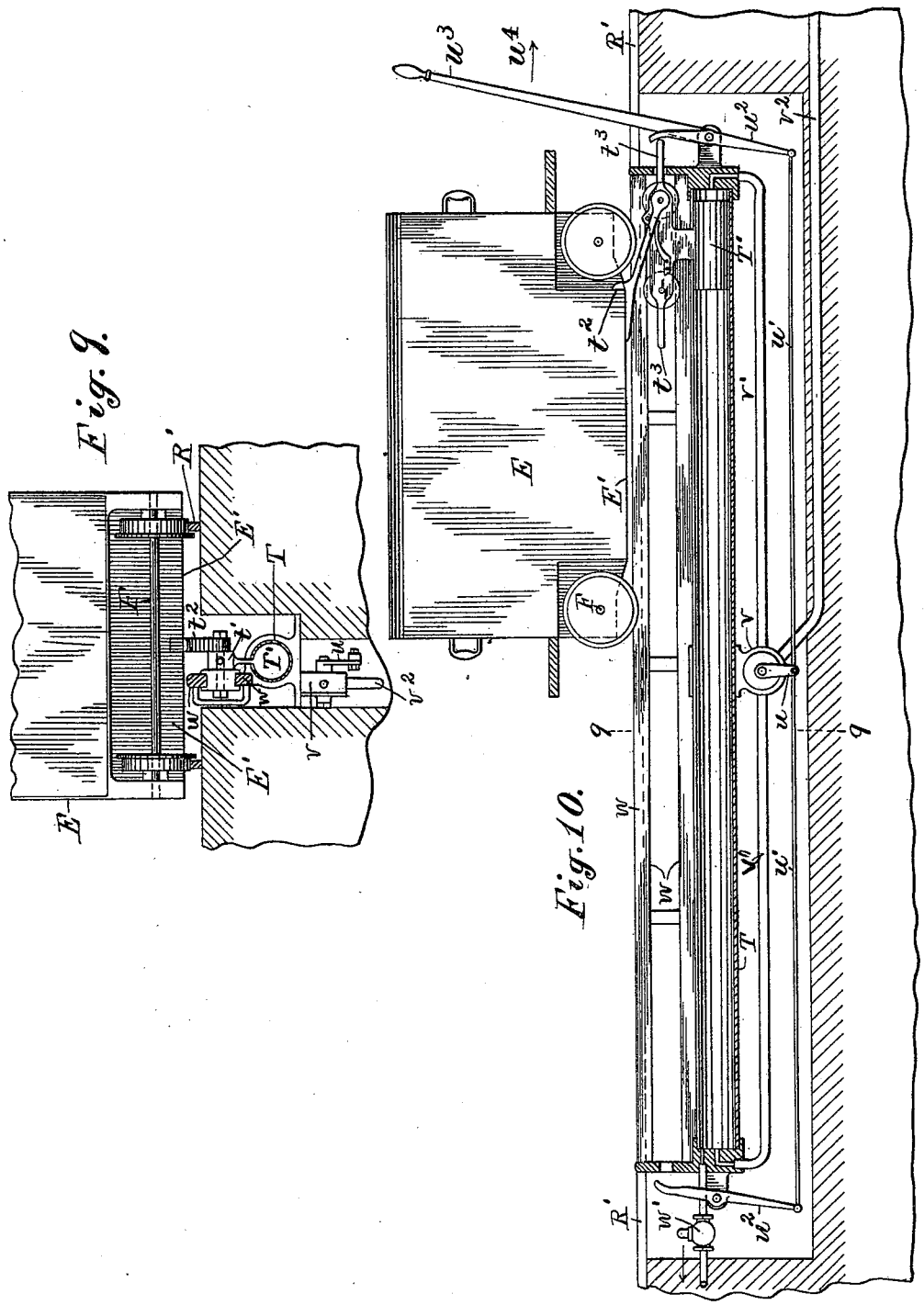
Attest:
L. Lee
Edw. F. Kinsey
Inventor.
Benjamin F. Carpenter,
per Thomas S. Crane, Atty.
THE NORRIS PETERS CO., PHOTO-LITHO., WASHINGTON, D. C.

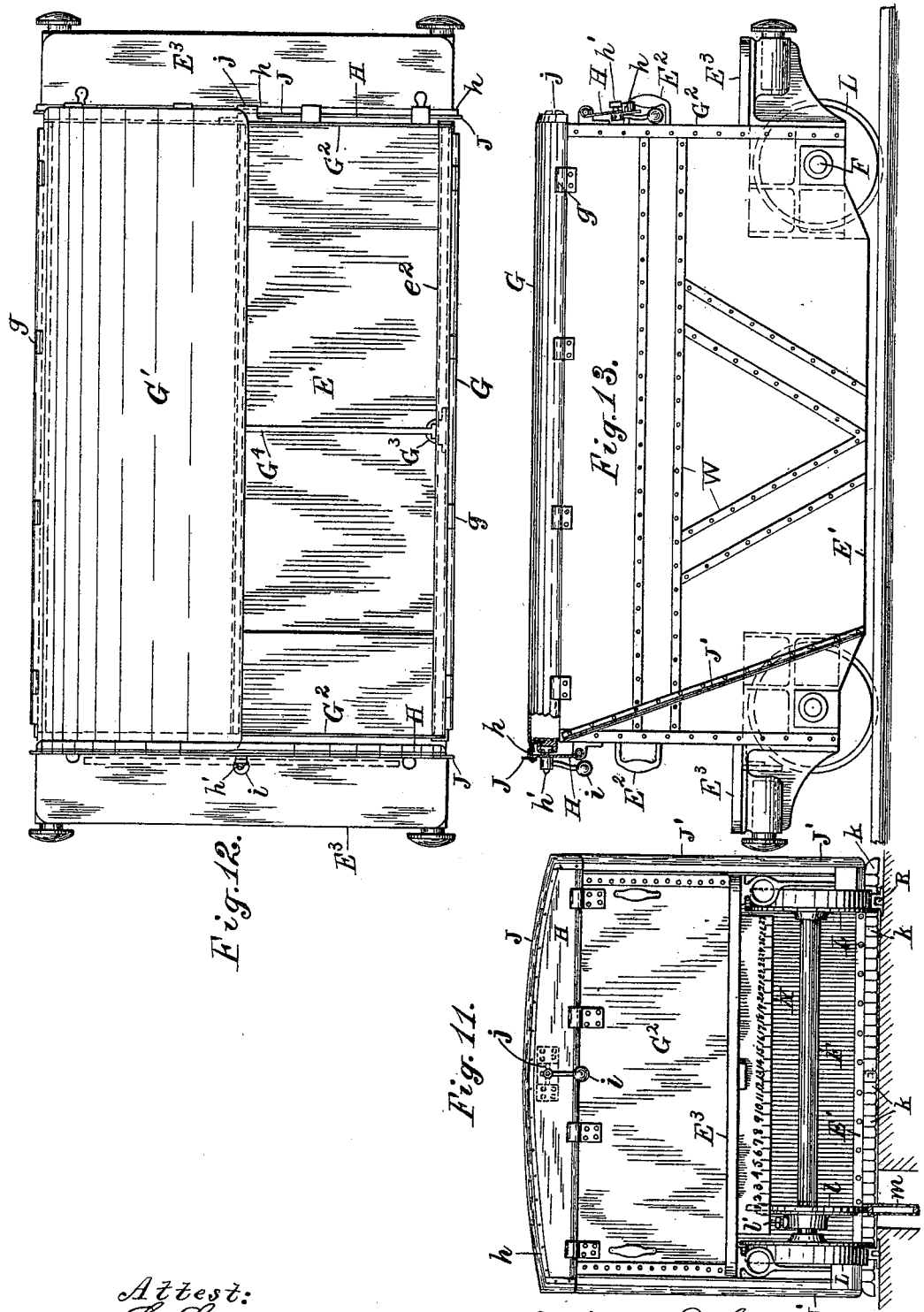

No. 623,944. Patented Apr. 25, 1899.
B. F. CARPENTER.
APPLIANCE FOR AUTOMATICALLY OPERATING PNEUMATIC OR ELECTRIC CARS.
(Application filed Dec. 4, 1897.)
(No Model.) 6 Sheets—Sheet 6.
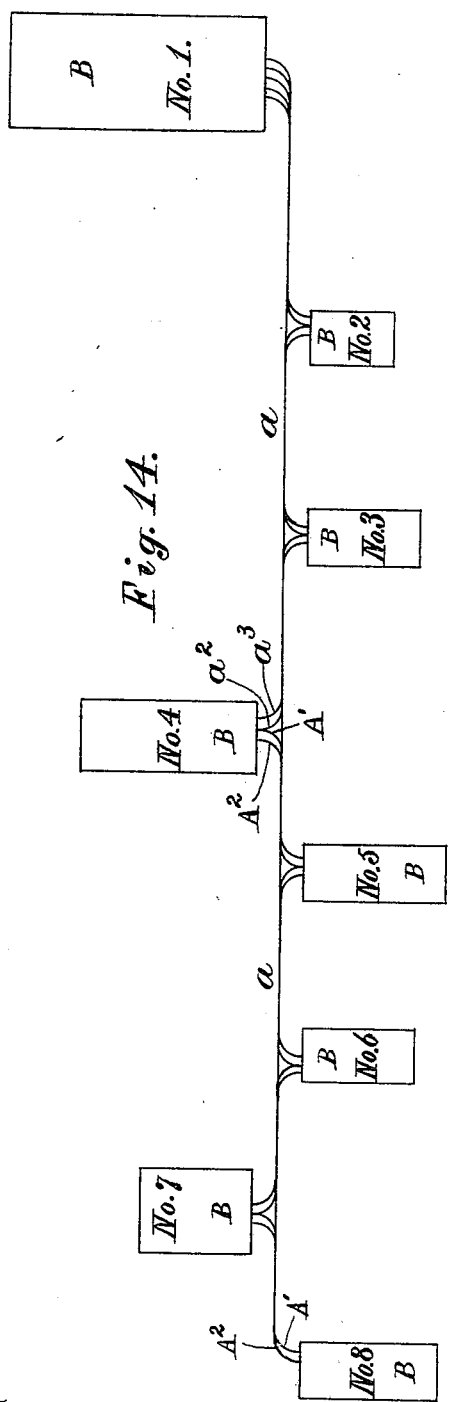
Attest:
Edw. F. Kinsey
Jacob Marx
Inventor.
Benjamin F. Carpenter,
per Thomas S. Crane, Atty.

UNITED STATES PATENT OFFICE.

BENJAMIN F. CARPENTER, OF ROSELLE, NEW JERSEY, ASSIGNOR OF ONE-HALF TO CHARLES N. FOWLER, OF ELIZABETH, NEW JERSEY.

APPLIANCE FOR AUTOMATICALLY OPERATING PNEUMATIC OR ELECTRIC CARS.

SPECIFICATION forming part of Letters Patent No. 623,944, dated April 25, 1899.

Application filed December 4, 1897. Serial No. 660,791. (No model.)

*To all whom it may concern:*

Be it known that I, BENJAMIN F. CARPENTER, a citizen of the United States, residing at Roselle, county of Union, State of New Jersey, have invented certain new and useful Improvements in Appliances for Automatically Operating Pneumatic or Electric Cars, fully described and represented in the following specification and the accompanying drawings, forming a part of the same.

The present invention relates to a railway system for underground service in which the main tunnel is continuously open from end to end, so that any number of cars or trains can be driven uninterruptedly along a track within such tunnel, and a series of station-yards (free from the air-current) is provided wholly outside of such tunnel and connected therewith in succession by branch tunnels.

This system is adapted for the automatic transportation of freight, which necessitates the holding of the cars at the station for a considerable length of time to load and unload the goods, and the invention provides a means of despatching the cars from any station to any other station in the system and automatically switching the car from the main-line track into the designated station-yard, means for bringing the car to rest automatically within the yard, and means for propelling it from such station automatically into the main-line tunnel to despatch it to another station.

The successive stations are in this system provided with successive designations, and the space between the track-rails in the main tunnel is divided into a corresponding series of designated spaces, and a switch-lever is arranged antecedent to the switch for each branch tunnel in the designated space between the main-track rails which corresponds with the designation of the adjacent station.

Each car employed in the system is provided upon one of the revolving car-axles with a gage-wheel adjustable in a series of predetermined positions between the track-rails corresponding to the designated positions of all the switch-levers in the main-line tunnel and is fixed before despatching a car to a given station securely upon the axle in the position corresponding to the switch-lever of the given station, so that the gage-wheel may clear any other switch-lever between the main-line rails, but may actuate the switch-lever of and divert the car (by the opening of the switch) into the designated station.

This system permits the use of large cars capable of carrying one or more tons of freight, and thus requires very different appliances for supporting, switching, and stopping the cars from the pneumatic carriers, which are propelled and brought to rest within a smooth cylindrical tube. The tracks to support the cars require strong and heavy switch-points which cannot be moved instantaneously, and I therefore use switch-levers of great length—as sixteen feet—placed at a very slight inclination to the level of the track, and by securing the gage-wheel rigidly upon the revolving car-axle I avoid any friction in the operation of such wheel upon the switch-lever, as the periphery of the wheel is positively rotated at about the same speed as it is carried forward while passing over the lever.

Where two tunnels are used to carry cars in opposite directions and the cars from both tunnels are delivered into the same station, it is necessary to bring the cars from the upper and lower tunnels to the same grade within the station to conveniently handle the cars, and it is more convenient to discharge the cars from the branch tunnels into the yard before bringing the cars to rest, so as to utilize the momentum of the cars in overcoming any elevation of the track in passing from the main tunnel to such yard. To arrest the cars after they are wholly discharged from the tunnel, I provide upon the yard-rails a detached chamber termed a "car-pocket" herein and provide the front or forward end of the pocket, as is common in such cases, with closed doors to confine the air, which brings the car gradually to rest within the pocket. A pawl is provided within the pocket to engage the car when arrested and prevent the compressed air from driving it out of the pocket, and the mouth of the pocket is flared to prevent collision with the rapidly-moving car as it enters the pocket, the periphery of the car being provided with the usual packing to prevent leakage of air in the tunnel. To receive the cars in the yard at brief intervals, I provide means, such as a hand-lever, for quickly closing the doors of the car-pocket when opened and means for quickly opening the doors when unbolted by means of another hand-lever. The two hand-levers are arranged in proximity to one another, so that a single operator (when a car is arrested in a pocket) can readily unbolt the doors to discharge the cars and as readily close the doors to receive another when the car is discharged. The car may be automatically discharged from the pocket by a slight downward inclination of the track-rails leading therefrom. Where cars are received frequently in the same station, two pockets may be used and the cars switched alternately into such pockets. After the car enters the branch tunnel on its passage to the station it operates upon a switch-closing lever, and thus closes the main-line track for the passage of subsequent cars to points beyond such station. An air-gate is fixed in the branch tunnel and is opened in advance of the car by a gate-lever arranged between the track-rails like the switch-lever, so as to be actuated by the same gage-wheel, and such air-gate is closed subsequent to the passage of the car by the actuation of a correspondingly-disposed lever. A gage-board is fixed beneath the car adjacent to the gage-wheel and provided with a series of designations corresponding to those of the series of successive stations, and such marks upon the gage-board are arranged in relation to the track-rail in the same order (or successive disposition) as the switch-levers corresponding to the several stations. The levers for opening and closing the switch-points for a given station and the gate within its branch tunnel are all disposed in the same relation to the track-rails, and the setting of the gage-wheel opposite the mark upon the gage-board, which designates a given station, thus serves to bring the gage-wheel into contact with all of such levers successively and disposes it to avoid any other switch-levers over which the car may pass in the main tunnel. When the car is discharged from the pocket within the station, it is diverted to a siding or suitable position for loading and unloading. When the car is ready for despatch to a selected station, the gage-wheel is fixed upon the axle of the car in the position designated upon the gage-board for such station, and it is then placed upon a track leading into an outlet branch tunnel, where a mechanical pusher is engaged with the car to start it at a suitable velocity through such branch tunnel into the main line, where the pneumatic current, if one is employed, carries it to its destination. An air-gate is preferably provided in the outlet branch tunnel and is opened and closed by the operation of the car upon suitable levers connected with such gate. These levers are made wide enough to coöperate with the gage-wheel in any of its adjustments.

In using two tunnels to carry the cars in opposite directions between stations the tunnels may be carried along between the stations side by side or one above the other; but adjacent to the stations they are arranged one above the other to permit the switching of the cars laterally into the station without interference. The station-yards are, for use with such tunnels, all disposed below the street-level, and the track leading from the lower tunnel is inclined upwardly where it enters such station to retard the car as it enters.

The invention, with the details claimed herein, will be understood by reference to the annexed drawings, in which—

Figure 1 is a plan of a station, showing the branch tunnels leading into and out of the same and the air shunts and blowers connected with the upper and lower tunnels. Fig. 2 is a cross-section of the same through the inlet branch of the lower tunnel, following the curve of the tunnel and the line $x\,x$ in Fig. 1. Fig. 3 is an isometrical perspective view of the car and the switch-actuating devices, one-half of the car-lid being raised. Fig. $3^a$ is a diagrammatical view of the car, showing the lids opened and hung downwardly at the sides of the car. Fig. 4 is a longitudinal section of the pocket with car therein. Fig. 5 shows the front end of the pocket, and Fig. 6 a plan of the same. Fig. 7 is a plan of the levers and connections for actuating the switch-points and air-gate. Fig. 8 is a diagram showing the tunnel in section on line 8 8 in Fig. 7. Fig. 9 is an elevation of the pusher for driving the cars from the station into the main line, the view being taken in section on line 9 9 in Fig. 10. Fig. 10 is a longitudinal section of the same through the center of the pneumatic cylinder. Fig. 11 is an end view of one of the cars; Fig. 12, a plan with one lid opened, and Fig. 13 a side elevation of the same. Fig. 14 is a plan view showing a series of stations arranged along and connected to the main tunnel.

In Figs. 1 and 2, $a$ designates the upper tunnel, and $a'$ the lower tunnel, traffic moving in the same in opposite directions, as indicated, respectively, by the arrows in Fig. 1.

A designates the building-lines at a street-crossing, the station-yard B and the station C being located beneath a side street at right angles to that through which the tunnels $a$ $a'$ are carried. The surface of the street is designated Y in Fig. 2, and the subapartment C may be connected with an apartment above at the level of the street, so that the goods may be brought through the streets by ordinary conveyances to and from the station.

D or D' represent the air-shunt, consisting of a chamber in which a blower $d$ is placed and actuated by a suitable motor, an electric motor being preferred. The inlet $d'$ of the blower is extended in one direction obliquely toward the tunnel to draw the air therefrom, and the outlet $d^2$ is extended obliquely in the opposite direction to discharge the air into the tunnel, as indicated by the arrows $d^3$. A fan-blower is shown having the inlet upon the center of the side and the outlet upon the periphery, and this construction facilitates the drawing of the air directly from and discharging it directly to the openings of the air-shunt without the bending of the pipes or passages. The air is thus moved with much less frictional resistance. The blower connections $d'$ and $d^2$ are shown broken where united with the upper tunnel in Fig. 1, as the blower is not shown in section. The air-shunt D and its blower connect with the upper tunnel to drive the air in one direction, while the air-shunt D' and its blower connect with the lower tunnel to drive the air in the opposite direction, as indicated by the arrows $d^4$.

In Fig. 1 the air-shunt D is shown in proximity to the station and located between the inlet and outlet branch tunnels at one side of the main tunnel; but the air-shunts have no necessary connections with the stations and can be located intermediate to the same or wherever desired, as their sole function, in connection with the pressure-blower $d$, is to maintain and accelerate the forward movement of the air. The blower is shown with its body set obliquely or at an angle of forty-five degrees with the main tunnel, so that its inlet-pipe $d'$ and its outlet-pipe $d^2$ are connected with the openings in the tunnel at the required angles to draw the air from the tunnel in the direction of its movement and to propel it forward where it enters the tunnel again. The space in the tunnel between the openings to which these pipes are attached is free from the air-current, but as the cars are operated at considerable velocity they would be carried past such neutral point by their own momentum. The air-shunts D D' are extended at opposite sides of the tunnels $a$ and $a'$ to secure room for the blowers.

The car E is represented in Figs. 11 to 13, inclusive, as formed of sheet metal with a drop-bottom E', extended downward between the axles F, and is provided with lids G G', hinged at the opposite top edges. The top of the tunnel and car are arched, and the lids rest when closed upon the ends $G^2$ of the car.

The cars are preferably made of such size—six or eight feet in length—that they may when loaded not be too heavy for one or two men to move, and handles $E^2$ are provided at the corners of the car to grasp and move it. The car is preferably made much less in height than a man, and a platform or step $E^3$ is extended across each end of the car at a suitable height for the attendants to stand upon and reach down into the car when the lids are open to conveniently remove its contents. The lids are constructed, as shown in Fig. $3^a$, to hang down by the sides of the car, so as to afford free access to the top upon the sides and ends when packing or removing the contents. The sheet-metal sides of the car are shown in Fig. 13 braced by convex stiffening-strips W, secured at their edges, and the top edges of the car are materially strengthened by the roll $e^2$, (shown in Fig. $3^a$,) while the hinging of the lids by a continuous joint to such edges holds the sides of the car firmly in position when the lids are closed, and thus affords strength without the use of additional material to stiffen such edges. In Fig. 3 a cross-bar $x'$ is shown supported transversely under the middle of the lids by sockets $x^2$, secured within the sides of the car at the top. The ends of the cross-bar are formed of T-heads, and the sockets are correspondingly shaped and closed at the bottom, so that the cross-bar sustains the weight of the lids when closed and prevents their vibration, which would bring them when moving at high velocity into occasional contact with the tunnel-roof. When the lids are open to unpack the car, the cross-bar is readily removed from the sockets and is replaced therein when the lids are closed and locked before starting the car.

The sides of the car are formed with a hollow roll $e^2$ at the top, and the opposite edges of each lid are also formed with a roll, which, with hinge-lugs $g$ upon the sides of the car, constitutes a continuous joint at the outer edge of each lid. A flap H is hinged upon each end of the car adjacent to the top and formed with the curved rib $h$, adapted to hook over the ends of the lids G G' when closed to prevent them from jarring and thus accidentally engaging the roof of the tunnel. The flap H at the right-hand end of the car in Figs. 12 and 13 is shown turned downward to release the lids, and the flap at the left end of the car in Fig. 13 is shown in section at the middle of its length to exhibit its engagement with the ends of the lids by the overlapping of the rib $h$. A bolt $h'$, provided upon the inner end with a T-head and upon the outer end with handle $i$, is arranged to engage a T-slot $j$ upon the car end when the rib is adjusted over the lids, and the lids are thus locked securely when the car is in motion. A flexible packing J is extended around the edge of the flap H, and similar packings J' are extended downward along the sides of the car to prevent leakage of the air-current which propels the car. The floor of the tunnel is made level between the rails R, and a series of flexible tongues or packings $k$ is depended from the drop-bottom of the car at one end to prevent leakage of the air-current between the rails. In Fig. 11 a cross-section of one of the levers $m$ for opening a switch or air-gate is shown between the rails, and the tongue $k$, which passes over such lever, would be raised thereby without disturbing the other tongues, which prevent the passage of the air.

A gage-wheel $l$ is shown secured adjustably upon the car-axle F between the track-wheels L, and a gage-board N is shown supported upon the car adjacent to such gage-wheel with a series of marks numbered from "1" to "27," inclusive, to indicate twenty-seven positions in which the gage-wheel may be set to operate upon twenty-seven different levers in connection with a corresponding number of stations. The gage-wheel is shown in Fig. 11 set at the first division of the scale and in contact with a lever which would be adapted to operate a switch and air-gate at a station, No 1, and the levers at the other stations would be suitably arranged between the track-rails R antecedent to such stations to operate with the gage-wheel when set at the numbers upon the scale corresponding to those stations. The gage-wheel when adjusted is secured upon the car-axle by a screw $l'$ or other suitable means, and thus rolls over the levers with which it operates.

In Fig. 1, $A'$ and $A^2$ designate, respectively, the inlet and outlet branch of the upper tunnel $a$, and the dotted lines $a^2$ designate the branch track from the lower tunnel, which with the arrangement of tracks shown in the station-yard B crosses the line of the upper track $A'$ at a lower level before it enters the yard and is then led up to the level of the yard from such crossing-point by an incline $B'$.

Figs. 7 and 8 show a portion of the main tunnel $a$ with the main-line rails R and the branch tunnel $A'$ with the rails $R'$ and the lever connections to the switch and air-gate, all the longitudinal dimensions being shortened for want of room upon the drawings. $m$ designates the lever in the main line connected by cranks $c$ and links $c'$ with the switch-points $d$ to open the same (by the depression of the lever under the gage-wheel $l$) as the car approaches the branch tunnel. Fig. 8 is diagrammatic in character and represents all the cranks and their links in full lines. Fig. 3 represents the car as thus depressing the lever $m$ to open the switch and close the main track for the passage of the car to the station, and in Figs. 7 and 8 the switch is represented as open and the car passed upon the branch track $R'$ just beyond the switch-points.

$m'$ designates a lever (beyond the switch) which is connected by crank $e$ and link $f$ with the crank $c$ and switch-points $d$ to close the switch after the car has passed the same. Recesses $K'$ are shown in the walls of the tunnel $A'$ beyond the lever $m'$, and air-gates K are hinged in such recesses and adapted to meet when closed across the tunnel in contact with shoulders $k'$ at the rear ends of the recesses and roof of the tunnel.

To make the gate as light and easily moved as possible, it is divided in two leaves, as shown in Figs. 7 and 8, and each leaf is pivoted upon a vertical hinge, so that its weight has no effect in opening or closing it.

The gates are sunk in the recesses when open, so as to be readily passed by the cars on the track. The open position of the leaves is represented by dotted lines in Fig. 8 and at the lower recess in Fig. 7.

The pivots $k^4$ of the air-gates are provided with cranks $k^3$, and cranks $e'$ are connected therewith by links $f'$ and actuated by the lever $m'$ to open the air-gates as the car approaches the same. A lever $m^2$ is shown beyond the air-gates and connected by cranks $e^2$ and links $f^2$ with the cranks $k^2$ to close the air-gates after the car has passed the same. In Fig. 8 the lever $m'$ is represented as raised and the lever $m$ depressed, as by the passage of the car E, which is represented between such levers. The cranks of these two levers are so arranged that each operates, when depressed, to raise the other; but the lever $m'$ can be raised, as hereinafter described, without depressing the lever $m$. The movement of the car over the lever $m'$ would therefore depress the same in shifting the switch-points $d$ to close the main-line track and raise the lever $m$, as indicated by dotted lines in Fig. 8, and leave it in readiness to be operated by a succeeding car to open the switch, if the car be intended for such station. Such depression of the lever $m'$ operates through the links $f$ and $f'$ to close the switch and open the air-gate simultaneously; but the links $f$ are provided with slotted heads $f^3$ where they are connected with the levers $e$ to permit the closing of the air-gates by the depression of the lever $m^2$ without reopening the switch.

Figs. 7 and 8 show the switch open to shunt the car to the station, the lever $m'$ being elevated; but the depression of the lever $m'$ operates to pull the link $f$ and close the switch, while the reverse movement of the levers $e'$ when actuated by the lever $m^2$ in closing the air-gates produces no effect upon the closed switch-points, but simply moves the pin of the crank $e$ in the slotted head $f^3$ and raises the lever $m'$ without affecting the switch. The lever $m$ would remain standing in readiness to open the switch when pressed by a passing car, such movement drawing the link-head $f^3$ to the position shown in Fig. 8, and thus enabling the link to close the switch whenever the succeding lever $m'$ was depressed. After the car has closed the air-gates it passes into the station-yard B, where it enters the pocket or brake-chamber $O^4$, which is provided at the forward end with doors $o'$ to retain the air within the pocket, which gradually checks the movement of the car and brings it to rest.

It will be observed that the switch-levers $m$, $m'$, and $m^2$ are all disposed much nearer to the right-hand track-rail than to the left and in the same relation to such rails, so that the gage-wheel when set to depress one of the levers would operate successively upon them all.

Where the gage-board is divided, as shown in Fig. 11, into twenty-seven spaces, the spaces between the tracks in which the various levers for the designated stations are arranged would be disposed respectively at the same distance from the right-hand rail as the corresponding spaces upon the gage-board, and each lever, and the gage-wheel which operates to depress it, could not exceed in width one twenty-seventh of the total available space. The whole system thus includes a series of designated stations, the division of the space between the track-rails to arrange the switch-levers in a corresponding series of positions, and a gage-wheel fixed upon the car-axle to operate with any designated lever by means of a gage-board having marks which bear the same relation to the track-rails as the levers of the successive stations.

Fig. 4 shows between the rails a weighted pawl P, which is depressed by the car as it enters the pocket and then serves to engage the rear corner of the car and prevent the depressed air from pushing it backward when stopped. The mouth of the pocket is flared to admit the moving car without any collision between its ends and the walls of the pocket. Where a pocket is formed within the closed end of a tunnel or pneumatic tube, it is obvious that there is no danger of such collision; but the car-pockets in the present construction are entirely separate from the tunnel and are erected upon the branch track within the station-yard, so that the swaying of the car upon such track (which is especially aggravated by the curve of the branch) is liable to produce collision unless the mouth of the pocket is made wider than the body of the pocket. Within the mouth the pocket is made of suitable size to properly fit the packings upon the car-body, and thus retain the air, which operates as a brake-cushion.

Figs. 4, 5, and 6 show the doors $o'$ secured to hinge-spindles $o^2$ at opposite sides of the pocket and provided with springs $o^3$ to hold the doors normally open. Vertical bolts $p$ at the top and bottom of the pocket serve to hold the doors locked when closed, and a handle $p'$ is connected with levers $p^2$, which are adapted to retract the bolts when it is desired to open the pocket to withdraw the car. A handle Q is connected by cranks $q$ and links $r$ with the spindles $o^2$ to close the doors. When the car has been withdrawn, the bolts $p$, having inclined jaws, as shown in Fig. 4, permit the doors to lock automatically when pressed shut by the handle Q, as shown in Fig. 6, which leaves the pocket in readiness to arrest the succeeding car. The handles $p'$ and Q are shown in Fig. 6 arranged near one another to be readily actuated by the same operator, and the doors may thus be promptly unbolted when the car is arrested in the pocket and then closed again as soon as the car is discharged to arrest the succeeding car. It is common in pneumatic tunnels to operate doors by means of levers, and my present invention therefore includes not only means for closing the doors, but the combination therewith of means for unlocking and automatically opening the doors, all within reach of a single operator. The cars would be despatched to the station at regular intervals or notice given of their despatch by telegraph or telephone, and the preceding car could thus always be removed from the pocket before any succeeding car would arrive.

In Fig. 1 two pockets are shown connected with the track from the branch tunnel A' to permit the receipt of the cars more rapidly, the alternate cars as they arrive being switched alternately into the right and left hand pockets. Two similar pockets are shown connected with the track from the branch tunnel $a^2$, which leads into the yard from the lower tunnel $a'$, and the four tracks from all of the pockets are converged upon a turn-table S, from which all of the cars may be delivered into the station-apartment C for loading and unloading. From this apartment the cars may be switched by delivery-tracks $s$ and $s'$, respectively, into the branch tunnel $A^2$ to enter the upper tunnel $a$ or into the branch tunnel $a^3$ to enter the lower tunnel $a'$, thus sending the cars in either direction that may be required. In each of these delivery-tracks a pusher $t$ is preferably located to start the car into the branch tunnel $A^2$ or $a^3$ at a suitable velocity to deliver it into the main tunnel, where the air-pressure would carry it to its destination. Such pusher is shown only upon the track $A^2$ near the station. The pusher may consist of a chain with dogs to catch and move the car; but I prefer to use a pneumatic device, such as is shown in Figs. 9 and 10, where T designates the pneumatic cylinder with piston T' movable therein and connected with a carriage $t'$, having its wheels guided by rails $w$, which are set between the rails R' of the delivery-track. (See Fig. 9.) The carriage $t'$ is provided with a spring-pawl $t^2$, which is pressed downward by the car as it passes over it and then engages the rear corner of the bottom, as shown in Fig. 10. A valve-box $v$ is shown connected with opposite ends of the cylinder by pipes $v'$, and the valve-arm $u$ is shown connected by links $u'$ with levers $u^2$, pivoted at opposite ends of the cylinder. A pipe $v^2$ supplies air to the valve-box under pressure, and the valve is so constructed that when the arm $u$ is in its central position, as shown in Fig. 10, the air is cut off from the pipes $v'$. A handle $u^3$ is provided to shift the levers $u^2$ and the valve-arm $u$ by moving in the direction of the arrow $u^4$, which admits the air to the rear end of the cylinder, (shown at the right of Fig. 10,) and thus drives the piston and pushes the car toward the opposite end of the cylinder. A check-valve $w'$ is shown at the forward end of the cylinder, which valve is loaded at a very light pressure, so as to permit the free escape of the air from the cylinder T when the piston is pushed forward. The carriage $t'$ has projections $t^3$ to contact with the upper ends of the levers $u^2$, the forward movement of the carriage reversing such lever so quickly as to reverse the valve and admit air to force the piston back to its initial position. Such a portion of the air escapes through the check-valve $w'$ that the piston moves back to its initial position very slowly, and the operation of the carriage upon the lever $u^2$ at the rear end of the cylinder is so gradual that the valve is shifted merely to its central position, as shown in Fig. 10, which wholly cuts off the supply of air and leaves the carriage with pawl in readiness to engage the succeeding car. When a car is moved by the attendants over the pawl $t^2$ and the latter impelled by the piston, the car is pushed into the outlet branch tunnel with suitable velocity to enter the main tunnel, where the air operates to carry it forward until it reaches its destination.

The outlet branch tunnel is shown in Fig. 1 provided with a gate V and with switch-levers $m^3$ at opposite sides of the gate, which serve as the gage-wheel passes over such levers to open and close the gate, respectively.

The levers $m^3$ are required to coöperate with the gage-wheel in any position whereto it may be adjusted between the rails, and such levers are therefore made wide enough to contact with the gage-wheel in any position.

A pawl P' is shown in Fig. 2 inserted between the tracks upon the upwardly-inclined grade B' to prevent any cars from backing into the lower tunnel if from any cause their movement is arrested or a car is accidentally pushed upon the top of the incline.

I am aware that in operating systems of surface cars it is common to actuate a switch by means of a lever pressed by the car; but in such cases the switch is left open when the car passes it, which would not be a suitable arrangement with cars operated automatically at a high velocity, as contemplated in the present invention, in which cars may be introduced to the main tunnel successively at a rapid rate, because they cannot possibly collide with one another when traveling in the same direction with the air intervening, which serves as a cushion between the cars. Such rapidity of delivery to the tunnel is facilitated by forwarding cars in succession to different stations, which secures a suitable interval in the arrival of the cars at any one station.

The system is operated as follows: The car when loaded at a given station has its gage-wheel or equivalent dog set to press only upon the lever adjacent to the destined station, and the car is thus directed into the inlet-tunnel of such station when it reaches the entrance to the same. The car then operates to close the switch and open the air-gate in the branch tunnel, closing the latter after it is passed and then entering the pocket or brake-chamber $O^4$, where it is brought to rest and prevented from rebounding by the pawl P. (Shown in Fig. 4.) An attendant then by means of the hand-lever $p'$ draws the bolts $p$ upon the front end of the pocket, permitting the springs $o^3$ to open the doors, when the car may be drawn forward to the turn-table or may be delivered automatically to such point by inclining the track downward slightly within the forward end of the pocket toward the turn-table. The car being then switched into the station-chamber is loaded or unloaded and the gage-wheel set to send it to a different station, as may be required. The car is then moved past the pawl $t^2$ of the pusher at the entrance to the outlet branch tunnel and the pusher being operated the car is impelled into the main tunnel, where it is carried to its destination, opening and closing the gate V by levers $m^3$.

It will be obvious that the means for switching the cars from the main line into the several stations, the means for bringing them to rest within the station-yard, and the means for pushing them from such yard into the main tunnel would operate the same whatever means of propulsion be employed for the cars, and they could therefore be used in connection with cars carrying an electric motor, a compressed-air motor, or any other agent of propulsion. The means of propelling the car is therefore immaterial to the operation of such parts of the invention, as will be understood from the fact that when cars are driven at a high velocity without any attendant they could not be brought to rest uniformly within a station-yard by merely cutting off the motive power, (by stopping the propelling-motor,) but would require the pocket or brake-chamber to overcome their required momentum. My claims to these appliances are not therefore limited to their use with cars propelled by an air-current.

It is common to form a close pocket in the end of a pneumatic tube to bring a light carrier to rest and to inclose a section of the main tube or tunnel by gates to form a station in which cars or carriers may be brought to rest; but neither of such constructions is adapted for the transportation of freight and heavy cars, which requires the switching of the cars from the main tunnel into a station free from the propelling-current, where the cars can remain for a considerable length of time to load and unload the same. In my system all obstructions, including gates or stations, are removed from the main-line track, and cars can thus be despatched at more frequent intervals than if any such obstructions were employed. My system thus provides stations connected with the main line by branch tunnels and tracks having automatic switches, while the designation of the stations in a regular series and the disposition of the switch-levers between the main-line-track rails in a graduated series of positions corresponding to the numbers of the stations permits a gage-wheel to be set in a predetermined position before despatching a car to a given station to coöperate with all the levers connected with such station. With such a system the cars are brought to rest within the station, which involves the use of a detached car-pocket to arrest the cars and requires the flaring mouth upon the pocket to avoid collision with the end of the car while approaching at high speed and swaying upon the track, as is unavoidable where a short curve connects the main tunnel with the station-yard. Such features of construction are of vital importance in handling heavy cars at high velocity, and I have therefore made a special claim to the detached car-pocket having a flaring mouth, as shown in Figs. 1, 4, and 6. The curvature of the mouth appears slight upon the drawings, which is due merely to the small scale upon which the figures are drawn; but the mouth is flared in practice sufficiently to clear the rigid body of the car and operate to gradually bend the packing upon the car into the sides of the pocket.

If the cars were arrested in the branch tunnel, they would not be delivered into the station-yard by their own momentum; but a considerable expenditure of time and strength would be required from the attendants to move the cars from such branch to a point in the yard accessible to the unloading apartment. If arrested in the tunnel, only the front end of the car would be accessible, while the use of a detached car-pocket, which is always open at the rear end, enables operators to reach the cars at both ends (when the front of the pocket is opened) and to thus prepare the pocket promptly to receive and arrest another car.

I am aware that it is common in various constructions to use an air-pocket to arrest a moving body and that the receiver of a pneumatic tube is commonly formed with such a pocket by temporarily closing the end of the tube; but in such case the carrier is small enough to be readily drawn from the end of the tube. In my construction cars are used of such weight that they cannot be easily moved with the necessary promptness except by two men, and the separation of the pocket from the pneumatic tunnel enables me not only to arrest the cars much nearer to the unloading-point, but renders them accessible at both ends to be pushed and pulled promptly from the pocket.

I am aware that a roller has been used (hung loosely upon a pivot or axle) to operate a switch-lever; but with such constructions the roller is not revolved positively before it strikes the switch-lever and its inertia produces a shock at the first contact and a frictional resistance in its movement over the lever which forbid its use in the movement of long and heavy switch-rails in the brief space of time that is requisite with cars switched automatically when moving at a high velocity. In the latter case the utmost strength in the parts and the most complete absence of shock and friction are essential to the continuous operation of the switches and gage-wheels which actuate the same.

My invention furnishes the means of securing the safe and continuous operation of the switches with cars moving at twenty miles per hour by securing the wheel rigidly upon the car-axle, so as to be rotated positively in unison with the movement of the car before it touches the switch-lever, and so that the gage-wheel cannot rattle or vibrate upon its pivot or be worn in the slightest degree, so as to admit of vibration, as when the axle rotates within a loose wheel. Such changes of construction are vitally important to the success of a system for automatically delivering heavy cars into various stations and bringing them safely to rest therein.

The extension of the railroad-tracks through the car-pockets permits the removal of the cars with the least possible delay to the unloading-point and permits the delivery of the cars automatically into the station with the utmost despatch.

I claim—

1. In a system for automatically operating wheeled cars, the combination and arrangement, with a series of designated stations, of a main-line tunnel adjacent thereto and means for causing an air-current to move uninterruptedly therethrough and having a main track therein with a series of branch tracks and switch-points successively connecting the stations with the main track, a series of station-yards free from such current, with branch tunnels extending from the main-line tunnel into such station-yards and inclosing such branch tracks, a series of switch-opening levers projected slightly above the track-rails one in advance of each switch-point and connected therewith, and arranged in a graduated series of successive positions between the main-track rails, a correspondingly-arranged series of switch-closing levers one in the branch track in each branch tunnel, and a gage-wheel slightly smaller in diameter than the track-wheels, fixed rigidly upon the car-axle between the said track-wheels before despatching the car to a given station, whereby the gage-wheel is rotated in unison with the movement of the car before it touches the switch-lever, and is enabled to depress the same without shock when moving at a high velocity, and also enabling it to clear the main-line rails when the car passes the switch to the branch track, substantially as shown and described.

2. In a system for automatically operating wheeled cars, the combination, with a series of designated stations, of a main-line tunnel adjacent thereto and having a main track with a series of branch tracks and switch-points successively connecting the stations with the main track, a series of branch tunnels inclosing such branch tracks and provided with movable gates, a series of switch-opening levers one in advance of each switch-point and connected therewith and arranged in a graduated series of successive positions between the main-track rails, a lever in each branch tunnel for closing the switch and opening the gate, and a lever for closing the gate, such levers having the same relation to the track as the switch-opening lever for such branch tunnel, a car having a revolving axle with track-wheels fixed thereon, a gage-board adjacent to such gage-wheel bearing a series of successive marks corresponding to the designations of the several stations and arranged in successive positions between the track-rails corresponding with the switch-levers of the said stations, and means for securing the gage-wheel to the car-axle before despatching the car to a given station in the position designated in correspondence with the said station whereby the said gage-wheel is adapted successively to actuate the levers for opening and closing the switch-point preceding such station and the levers for opening and closing the gate in the branch tunnel of such station, substantially as herein set forth.

3. In a system for pneumatically operating wheeled cars, the combination and arrangement, with a main-line tunnel having track-rails adapted to carry cars of several thousand pounds weight, and means for causing an air-current to move uninterruptedly therethrough, of a station-yard free from such current and a branch tunnel connecting the yard with such main-line tunnel, a branch track extended through the branch tunnel into the station-yard, and a detached car-pocket inclosing a section of such branch track within the station-yard and provided at its forward end with movable doors, the track-rails being extended through the said pocket, so that the cars, when arrested in the pocket, may be discharged from its forward end, and the isolation of the pocket from the tunnel in which the cars are transported, exposes the rear end of each car within the pocket, so that it is accessible at both ends, and may be pushed as well as pulled from the pocket, by direct manual agency, to promptly fit the pocket for renewed use, substantially as herein set forth.

4. In a system for pneumatically operating wheeled cars, the combination and arrangement, with the main-line tunnel having track-rails laid therein and means for causing an air-current to move uninterruptedly therethrough, of a station-yard free from such current and a branch tunnel connecting the yard with such main-line tunnel, track-rails in the yard and branch tunnel, with a switch connecting the same to the main-line track, the car having a flexible packing upon its periphery, and a detached car-pocket upon the yard-rails embracing a short section of the track sufficient to arrest the car outside of the tunnel and having a flaring mouth to freely admit the packing upon the car, hinged doors at the forward end of the car-pocket with bolts to resist the air-pressure when closed, and means, as a spring, for automatically opening the door when unlocked, a closing crank upon the door-hinge spindle, and two levers arranged in proximity to one another to be readily actuated by the same operator and connected respectively with the bolts for releasing the door and with the crank for closing the door, substantially as herein set forth.

5. In a system for pneumatically operating cars, the combination and arrangement, with the main-line tunnels $a$, $a'$, one above the other with track-rails laid therein of a station C with station-yard B contiguous to said tunnels, branch tracks leading from both of such tunnels into and out of the yard, cars having each a flexible packing upon its periphery, the car-pockets $O^4$ inclosing a section of the track within the yard B extraneous to the tunnel, upon each of such inlet branch tracks, with a flaring mouth to freely admit the packing upon the car, the branch track being extended through the pocket, and the front end of the said pockets having doors for delivering the cars from such separate pockets into the stations for loading and unloading, and a pusher arranged in the outlet branch tracks to propel the cars by momentum from the same into the main tunnel, the whole arranged and operated to arrest the cars automatically when entering the station and to discharge the same thereafter from the station into the main-line tunnel, substantially as herein shown and described.

6. In a system for automatically operating wheeled cars, the combination and arrangement, with a main-line tunnel having track-rails laid therein, a station and an outlet branch track from the station to the tunnel, of a pusher between the rails of such outlet-track, comprising a cylinder with piston movable therein, a carriage propelled by such piston with a pawl pressed normally upward from the carriage between the rails of the track, and a car having a shoulder adapted to depress the pawl when the car is pushed over the same, and to engage the pawl when the pusher is actuated, whereby the movement of the pusher drives the car forward upon the track, substantially as herein set forth.

7. In a system for automatically operating wheeled cars, the combination and arrangement, with a main-line tunnel, a station and an outlet branch from the station to the tunnel, of a pneumatic pusher comprising a cylinder with a piston movable therein, a carriage propelled by such piston and provided with means to engage the car, valve mechanism for supplying air to opposite ends of the cylinder, and means actuated by the carriage for shifting the valve mechanism, as and for the purpose set forth.

8. In a system for pneumatically operating wheeled cars of over one thousand pounds weight, the combination and arrangement with the main-line tunnel $a$ having track-rails R laid therein, and having two wholly-unobstructed lateral openings with wholly-unobstructed passage in the tunnel between such openings, with the blower-chamber D connected at its opposite ends to said openings, of the blower $d$ having its inlet and outlet connected directly to the said lateral openings, stations at intervals having branch tracks, and switches in the track-rails R for leading the wheels of the cars upon such branch tracks, and a series of wheeled cars moved uninterruptedly when in the main-line tunnel past the openings of the air-shunts, and brought to rest in the said stations exclusively, substantially as herein shown and described.

9. In a system for automatically operating wheeled cars, the combination, with a tunnel having a main-line track, stations with branch tracks leading thereinto, switch-levers disposed at different points between the main-line rails preceding such stations, a car with dog or wheel adapted to engage any of such levers at pleasure, and a flexible packing at the bottom of the car divided into flaps to pass over the several levers, substantially as herein set forth.

10. In a system for automatically operating wheeled cars, the combination, with a tunnel having a main-line track therein, and stations with branch tracks leading thereinto, of a series of cars adapted to traverse such track and having the car-top in close proximity to the roof of the tunnel, the car having lids hinged at its opposite edges and provided with means for securing the opposite ends of the lids during the passage of the cars through the tunnel, to prevent the catching of such ends upon the tunnel-roof, substantially as herein set forth.

11. In a system for automatically operating wheeled cars, the combination, with a tunnel having a main-line track therein, and stations with branch tracks leading thereinto, of a series of cars adapted to traverse such track and having the car-top in close proximity to the roof of the tunnel, the car having lids hinged by a continuous joint to its opposite edges to stiffen the edges of the top, and adapted to hang downwardly upon the outer sides of the car to afford free access to the interior, substantially as herein set forth.

12. In a system for automatically operating wheeled cars, the combination, with a tunnel having a main-line track therein, and stations with branch tracks leading thereinto, of a series of cars adapted to traverse such track and having the car-top in close proximity to the roof of the tunnel, the car having lids hinged at its opposite edges and folded together at the middle line, sockets within the sides of the car-top, and a cross-bar fitted removably to such sockets and to the middle portion of the lids when closed to prevent the latter from vibration, substantially as herein set forth.

13. In a system for automatically operating wheeled cars, the combination, with a tunnel having a main-line track and stations with branch tracks leading thereinto, and a series of wheeled cars adapted to traverse such tracks, each having lids hinged at opposite sides of the car-top, flaps H hinged at the ends of the car having each a rib $h$ adapted to hook over the ends of the lids, means for locking the flaps when the car is in motion, and a packing projected from the edge of the flap to make the air-joint with the roof of the tunnel, substantially as herein set forth.

14. In a system for automatically operating wheeled cars, the combination, with a tunnel having a main-line track, of a station-yard, a branch track with rails leading from the main line into such yard, a pneumatic pocket or brake-chamber independent of the tunnel and erected upon such branch track with movable door at the forward end to arrest and release the cars, a pawl hinged between the rails of the track and pressed normally upward within the pocket, and a shoulder upon the car to engage the point of the pawl when the car is in the pocket, to prevent the rebounding of the cars, substantially as herein set forth.

In testimony whereof I have hereunto set my hand in the presence of two subscribing witnesses.

BENJAMIN F. CARPENTER.

Witnesses:
THOMAS S. CRANE,
EDWARD F. KINSEY.